Oct. 19, 1965  M. L. TUCKER  3,212,591
DIAMOND DRILLING APPARATUS
Filed Oct. 19, 1962  10 Sheets-Sheet 5

FIG. 6

INVENTOR
MANA L. TUCKER
BY Raymond G. Mullee
ATTORNEY

FIG.8

INVENTOR
MANA L. TUCKER
BY
Raymond G. Mullee
ATTORNEY

Oct. 19, 1965  M. L. TUCKER  3,212,591
DIAMOND DRILLING APPARATUS
Filed Oct. 19, 1962  10 Sheets-Sheet 9

INVENTOR.
MANA L. TUCKER
BY Raymond G. Mullee
ATTORNEY

Oct. 19, 1965  M. L. TUCKER  3,212,591
DIAMOND DRILLING APPARATUS
Filed Oct. 19, 1962  10 Sheets-Sheet 10

INVENTOR.
MANA L. TUCKER

BY Raymond G. Mullee
ATTORNEY

United States Patent Office 3,212,591
Patented Oct. 19, 1965

3,212,591
DIAMOND DRILLING APPARATUS
Mana L. Tucker, New Hartford, N.Y., assignor to Chicago Pneumatic Tool Company, New York, N.Y., a corporation of New Jersey
Filed Oct. 19, 1962, Ser. No. 231,796
14 Claims. (Cl. 173—149)

This invention is concerned with diamond drilling apparatus. Apparatus of this nature embodying the invention, though subject to wide application, is especially suited for use in making borings into the earth for exploratory purposes. An annular cutting diamond bit having an associated core barrel is used in making such borings. The shank of the bit is a string of hollow drill pipe which is subjected to downward pressure as it is rotated, causing the bit and pipe to move down into the hole that is being bored. Circulating water is fed under pressure through the upper end of the hollow drill pipe to the bit and through the latter to the bottom of the hole. The water serves to cool the bit and also acts to flush the cuttings from the bottom of the hole to the surface. As the drill pipe or string follows the bit down the hole, additional lengths of pipe are added as may be needed. The drill pipe is held by a chuck unit, which in turn is rotated by an engine driven spindle. The spindle is also slidable and moves downward with the chuck as a unit. It is understandable that the chuck unit can only move downwardly for a limited distance with the drill pipe. It then becomes necessary for the chuck unit to the released from the drill pipe and re-elevated to re-grip the drill pipe at a higher level so that it can again carry the drill pipe downward. It is obvious that in drilling a hole of any great depth that this unchucking and chucking operation will be often repeated.

An object of this invention is to provide an improved time and labor saving apparatus of the foregoing nature.

Another object of this invention is to provide an advantageous arrangement in apparatus of this type whereby the unchucking and chucking operations are rapidly done with minimum effort and loss of time.

A further object of this invention is to avoid during the operation of apparatus of this kind loss down the hole of expensive bits and drill pipe because of failure of the chuck jaws to hold. This object is accomplished by means of a strong spring load constantly pressing the jaws into gripping relation with the pipe. Under this arrangement the action of the spring load is automatic and does not depend upon any positive action of the operator to cause gripping of the jaws or to maintain the jaws in gripping relation with the drill pipe.

Another object of this invention is to provide an advantageous arrangement in apparatus of this type, wherein the unchucking operation is selectively hydraulically performed, and the chuck operation is automatically performed through the action of a strong spring subsequent to the hydraulic operation.

A further object of this invention is to provide a hydraulically operated chuck adapted to be elevated relative to a string of drill pipe and which is subject to remote control by an operator standing on the ground out of reach of the elevated chuck. Because of this advantageous arrangement the operator is not obliged to leave his position at the side of the apparatus; the operator thereby avoids the dangers of oily, slippery platforms which he might otherwise be required to climb to operate the chuck.

Another object of this invention is to provide an integral hydraulic system utilizing a common pump and sump to hydraulically operate a chuck and to hydraulically reciprocate a cross head carrying the chuck.

A still further object of this invention is to provide in diamond drilling apparatus a common hydraulic system for hydraulically reciprocating a cross head supporting the chuck and for hydraulically operating the chuck, including separate valves integrated in the system, one located within manipulative reach of an operator on the ground for operating the cross head, and the other located remotely from the chuck and also within manipulative reach of the operator on the ground for operating the chuck.

The invention further lies in the particular construction and arrangement of its component parts as well as in their cooperative association with one another to effect the benefits and objects intended herein.

Figure 1:
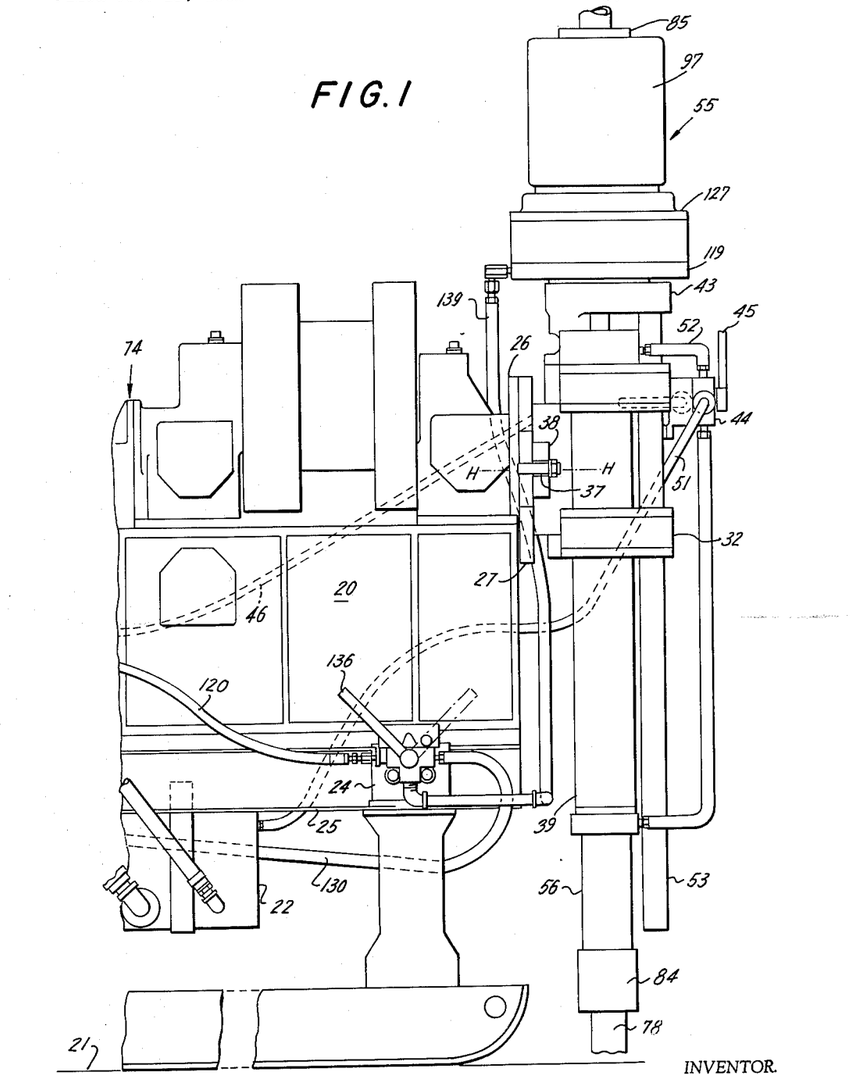
FIG. 1 is a schematic view of diamond drilling apparatus embodying the invention, a portion being broken away at the left for convenience of illustration.
Figure 7:
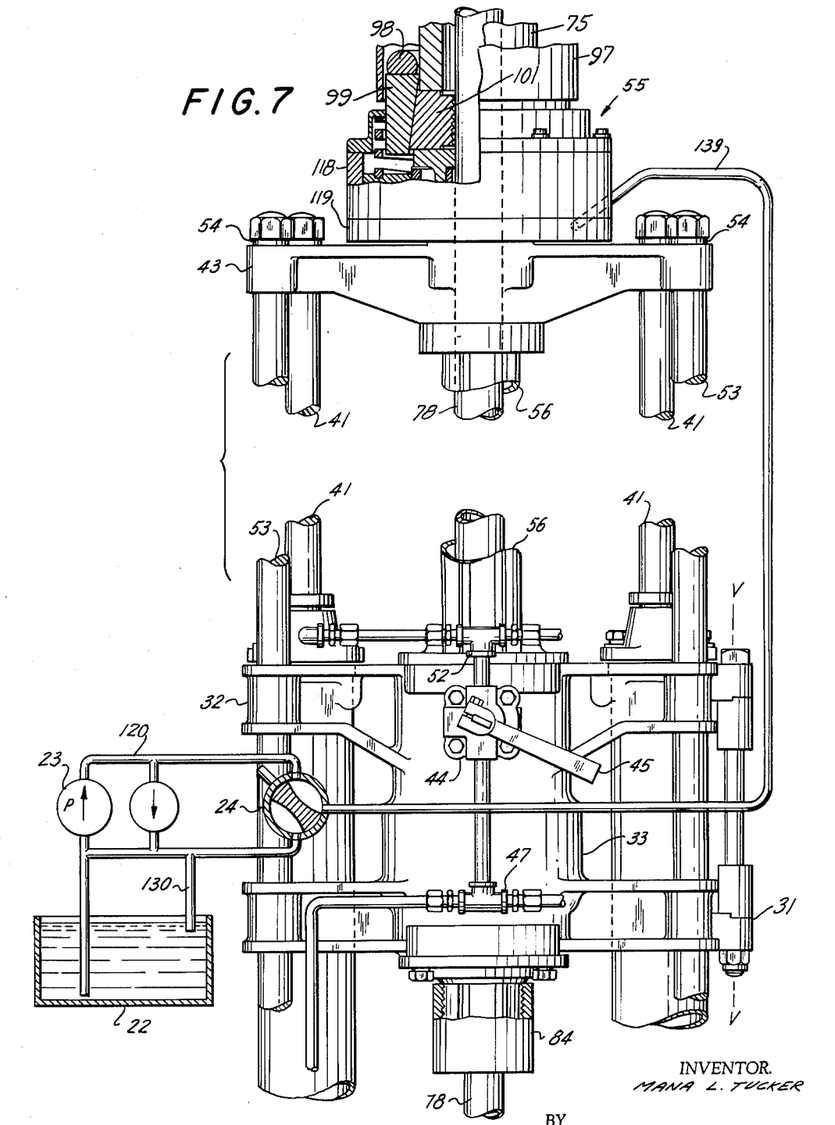
FIG. 7 is a fragmentary elevational view of the front end of the swivel head and associated chuck, showing the cross head as having been raised to its elevated position relative to the swivel head.

The apparatus embodying the invention and illustrated in the several figures of the drawings includes a main supporting bed frame 20 adapted to rest solidly in a stationary position upon the ground 21. Anchored to this frame are a hydraulic sump 22 and a hydraulic pump 23 (FIGS. 1, 7). Interconnected by appropriate hose lines with the sump and pump is a hydraulic chuck control valve 24. The latter is anchored to a channel beam 25 of the bed frame within manual reach of an operator standing on the ground. Mounted fast to the front end of the bed frame is an upstanding rigid bearing plate 26 (FIGS. 1, 2, 3) to which is swivelly mounted a swivel frame or hinge ring bracket 27 for relative swivel movement about a substantially horizontal axis H—H.

Figure 4:
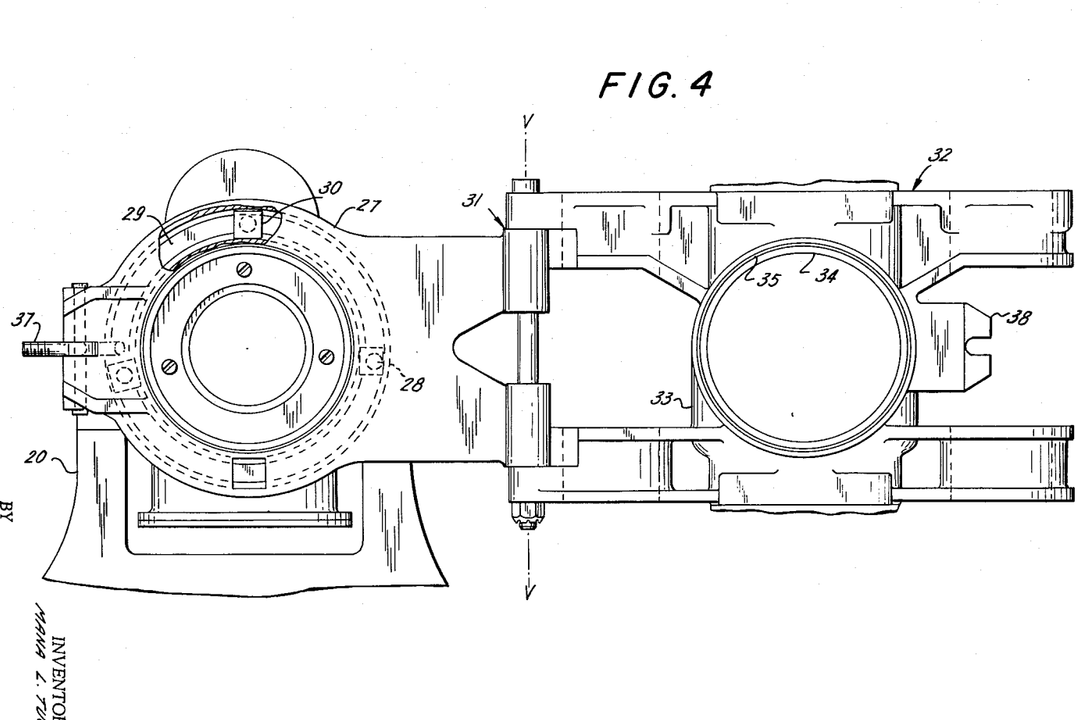
FIG. 4 is a detail view in elevation showing the swivel head as having been swung on its vertical axis V—V away from the hinge ring bracket.

The bracket 27 is swivelly bolted to the bearing plate by means of a group of three screws 28 spaced 90 degrees apart, the shank portions of which extend from the bearing plate through an annular channel 29 in the bracket, whereby the bracket is able to swivel or rotate through 360 degrees relative to the bearing plate about the axis H—H, the heads 30 of the screws riding in the channel 29. The bracket 27 has at one side thereof (FIGS. 4 and 6) a hinged connection 31 with a swivel frame or head 32, enabling the latter to swing away from the bracket 27 about a substantially vertical axis V—V. The heads 30 (FIG. 2) at one end of the screws 28 and nuts threaded on the opposite ends hold the bracket to the bearing plate against relative axial movement.

Figure 2:
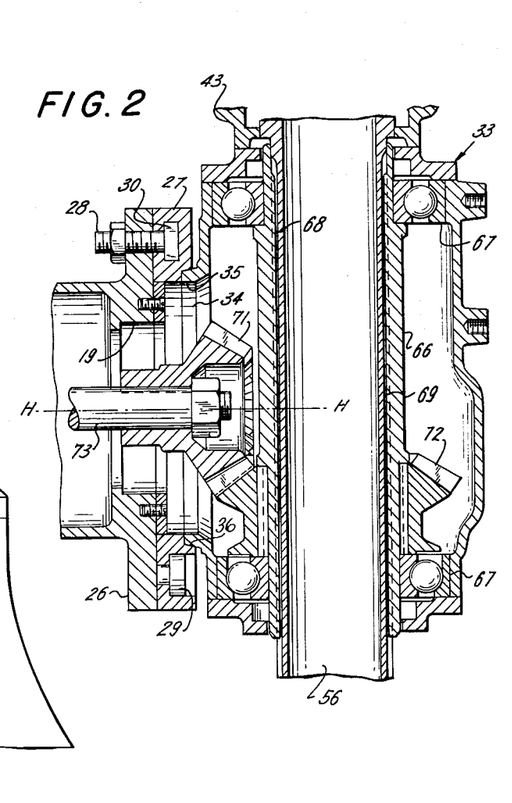
FIG. 2 is a vertical section through the swivel head.
Figure 3:
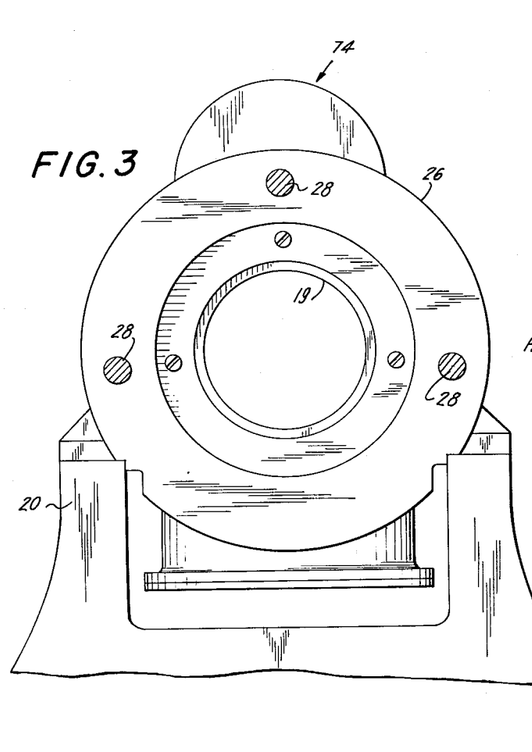
FIG. 3 is an end view of the bearing plate and associated bed frame.

The swivel head has a central hollow body portion 33 provided with an annular opening 34 (FIG. 4) at its rear. An annular axially protruding rib 35 about this opening is adapted to mate with a complementary opening 36 in the bracket 27, when the swivel head is swung on its hinge into engagement with the bracket (FIG. 2). When the swivel head is thus engaged, an eyebolt 37 (FIGS. 1, 4) pivoted to the other side of the bracket 27 may be releasably bolted, as appears in FIG. 1, to a forked side extension 38 of the swivel head so as to retain the latter engaged to the bracket 27. When so retained, the swivel head and bracket may be swivelled as a unit relative to the bearing plate 26.

Figure 6:
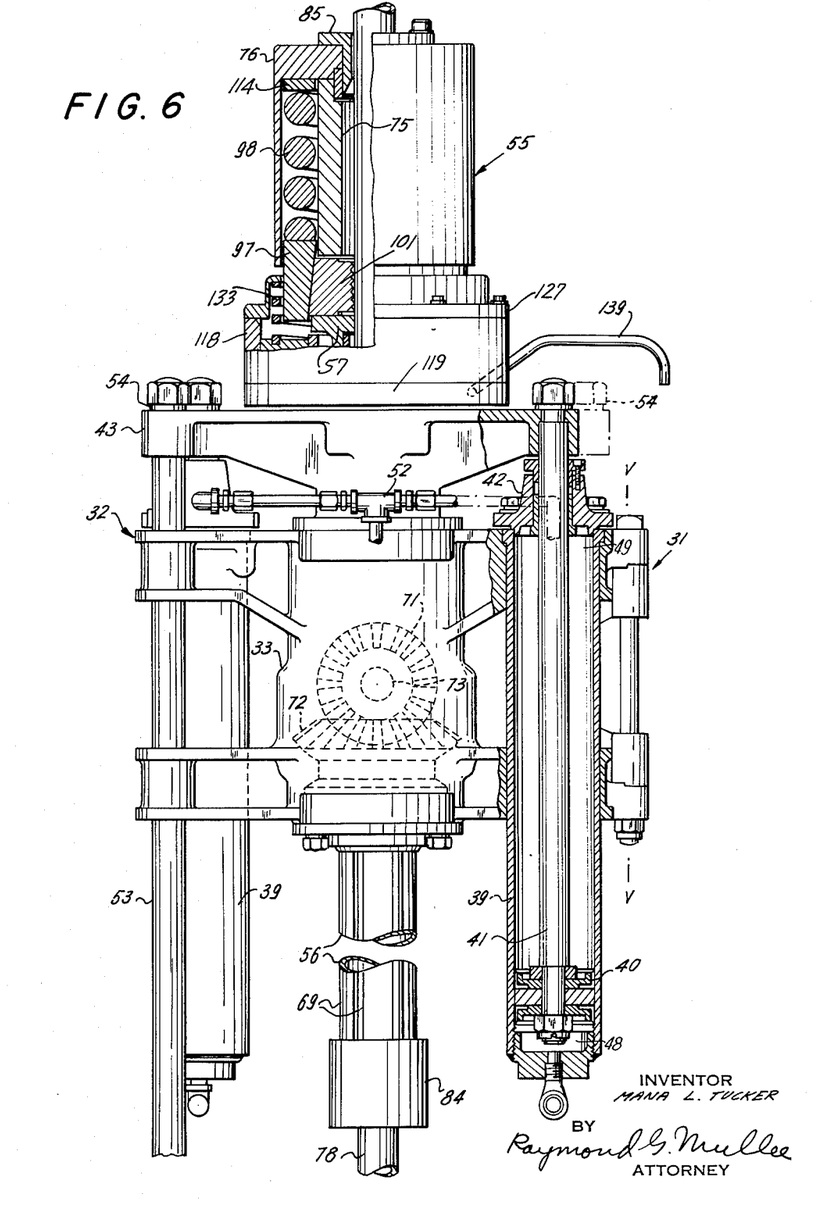
FIG. 6 is an elevational view of the front end of the swivel head and associated chuck, showing the cross head in its low position relative to the swivel head.

Rigidly mounted in the framework of the swivel head in parallel relation to one another at opposite sides of the central body portion 33 is a pair of hydraulic cylinders 39 (FIG. 6). Each cylinder has a piston 40 therein bolted to one end of a piston rod 41. The free end of the piston rod extends through an end seal 42 of the cylinder head and is bolted fast to a separate end of an elevator beam or cross head 43. The upper and lower ends of the cylinders are interconnected by means of appropriate conduits and by means of a hydraulic control valve 44 (FIGS. 1 and 7) with the pump 23 and the sump 22. The control valve is mounted to the front area of the swivel head within manual reach of an operator standing on the ground. When the valve control lever 45 is manipulated in one direction, hydraulic fluid is admitted over the pump hose line 46 through the valve and through common conduit lines 47 simultaneously to the bottom ends 48 of both cylinders causing the piston rods 41 to elevate the cross head as the pistons rise simultaneously in the cylinders. Hydraulic fluid trapped in the upper ends 49 of the cylinders is drained as the pistons rise through the control valve 44 and a return hose line 51 to sump. When the control lever 45 is manipulated in the opposite direction, hydraulic fluid is admitted from the pump hose line 46 through the valve 44 and common conduit lines 52 simultaneously to the upper ends of both cylinders causing the piston rods 41 simultaneously to lower the cross head. Any hydraulic fluid trapped in the bottom ends of the cylinders is drained through the control valve and the return line 51 to sump.

The reciprocal movement of the cross head relative to the swivel head is further stabilized and guided by means of a pair of parallel rails 53 supported for slidable movement in the framework of the swivel head in parallel relation to the piston rods 41. The upper free ends of the rails are bolted fast as at 54 to the cross head 43. The rate of speed at which the cross head is caused to move in either direction is controlled by the operator in manipulating the control valve 44.

Supported on the cross head 43 so as to be carried up and down with the latter is a drill chuck assembly 55. This assembly includes a chuck unit 50 and a hydraulically operable piston unit 60. The chuck unit is rotatable relative to the piston unit by means of a spindle 56. The chuck unit includes a hollow body member 57 having an upper externally coned portion 58 from which axially depends a reduced skirt portion 59. The latter depends freely into an axial bore 61 of the cross head 43 and bears at its bottom end upon the inner race of a bearing 62. The latter is fitted into the bore 61; and the outer race of the bearing is seated upon an internal annular shoulder 63 of the bore.

The spindle 56 is supported for rotation in the bearing; and it has an upper threaded stub end 64 which is threadedly engaged in the skirt 59 of the chuck body for rotation of the latter. A peripheral shoulder 65 of the spindle limits against the under end of the inner race of the bearing 62. The spindle, as well as the chuck body 57, are restrained against axial movement relative to the bearing 62 by means of the shoulder 65 limiting at one end of the bearing and by means of the skirt 59 limiting at the opposite end.

The spindle is hollow and elongated; it extends from the chuck body in the cross head through the bottom end of the swivel head, as appears in FIGS. 6, 7. Below the cross head the spindle extends slidably through a driving sleeve 66 disposed axially within the body portion (FIG. 2) of the swivel head. The driving sleeve is journaled for rotation in bearings 67 fitted in the upper and lower ends of the swivel head; and it has longitudinal internal spline grooves 68 which are slidably engaged by longitudinal splines 69 on the spindle. The spindle is rotatively driven by the driving sleeve, which in turn is driven by angle gearing, such as the biveled gears 71, 72 drivingly associated with a drive shaft 73.

The drive shaft 73 is connected by means of a manipulative clutch, not shown, to an engine generally designated 74 mounted on the bed frame 20. The drive shaft extends concentrically with the axis H—H through the bearing plate 26 and bracket 27. A bearing, not shown, may be seated in the opening 19 of the bearing plate as a support for the drive shaft. The drive shaft further extends into the rear opening 34 of the swivel head for a short distance, as appears in FIG. 2. The bevel gear 71 fixed upon the end of the drive shaft drivingly engages the bevel gear 72 fixed upon the driving sleeve 66. By this construction, rotation of the driving sleeve is translated by means of the spline connection 68, 69 into rotation of the spindle. The splined relation of the spindle with the driving sleeve also allows axial sliding movement of the spindle relative to the driving sleeve and to the swivel head. Further, when it is desired to swing the swivel head on its vertical axis V—V away from the bracket 27 to the position shown in FIG. 3, the driven bevel gear 72 will be carried with the swivel head clear of the driving gear 71. The annular opening 34 at the rear of the swivel head is adequate to allow the swivel head together with the driven gear 72 to swing outwardly clear of the driving gear 71. Further, since the axis of rotation H—H of the swivel head is the same as that of the drive shaft 73, the bevel gear 72 is enabled to roll relative to the gear 71 when the swivel head is rotated about the axis H—H.

Figure 8:
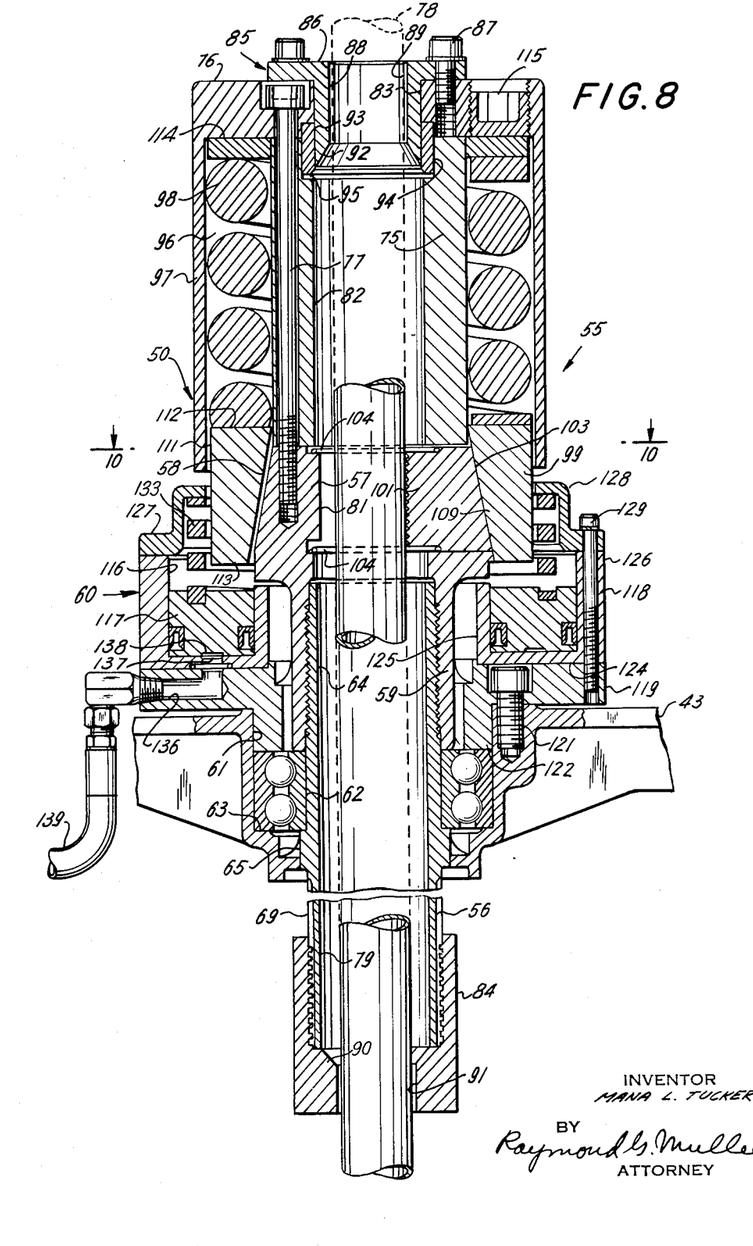
FIG. 8 is a vertical section taken on line 8—8 of FIG. 9 through the chuck and cross head, the swivel head being omitted.
Figure 9:
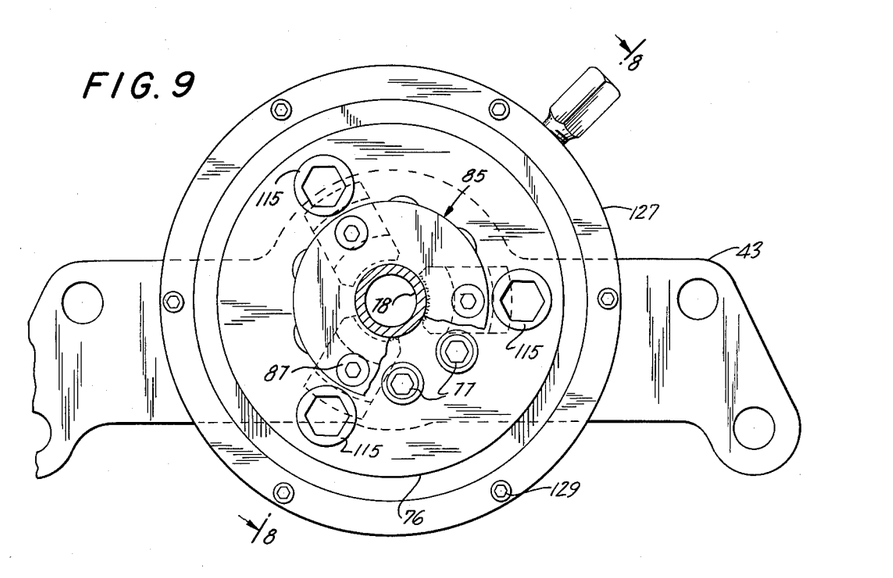
FIG. 9 is a top plan view of FIG. 6.
Figure 10:
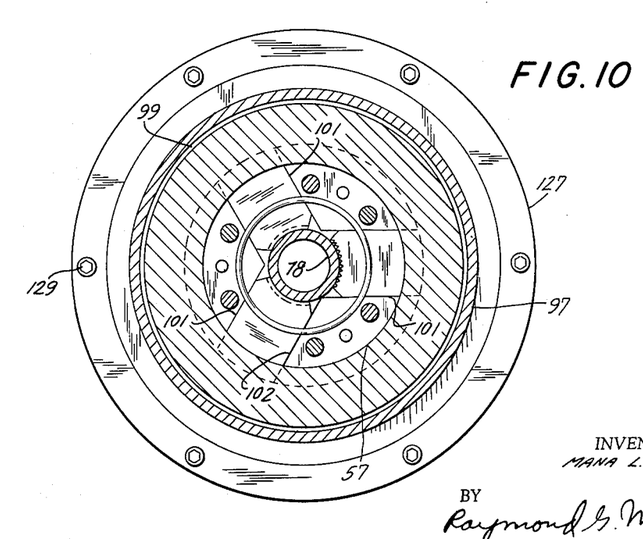
FIG. 10 is a cross section taken on line 10—10 of FIG. 8.
Figure 11:
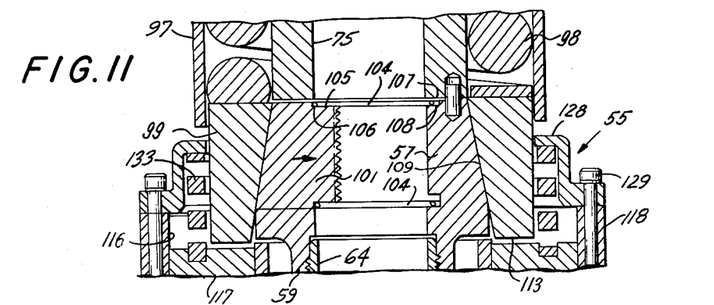
FIG. 11 is a sectional detail of the chuck showing the pressure ring in its lowermost position, in which position the chuck jaws have been fully moved within their radial slots.

Seated atop the chuck body 57 is a guide collar 75 (FIG. 8). Atop the guide collar is a thick cover plate 76. The cover plate, guide collar, and chuck body are bolted fast to one another by means of a ring of screws 77 (FIGS. 8, 9).

As earlier mentioned in the introductory portion of this specification, this apparatus is especially suited for core drilling operations in which hollow drill pipe 78 is used having the usual diamond bit, not shown, attached to its bottom end. In associating the drill pipe with the apparatus, it is extended axially through the hollow interiors or bores 79, 81, 82, 83 respectively of the spindle, chuck, guide collar and cover plate. These bores register with one another and are relatively greater in diameter than the drill pipe. The drill pipe also extends through a cap bushing 84 threadedly engaged on the bottom end of the spindle; and it further extends through a plate bushing 85 mounted to the cover plate. The cap and plate bushings serve to stabilize and centralize the drill pipe in the chuck and in the associated guide collar and spindle. The plate bushing 85 has a plate portion 86 which is bolted by means of a ring of screws 87 (FIGS. 8, 9) to the top of the cover plate; and it has a depending bushing portion 88 which is fitted in the bore of the cover plate. The plate bushing has an axial hole 89 which registers with a hole 91 in the cap bushing 84.

These holes 89, 91 correspond substantially in diameter to that of the outer diameter of the drill pipe, there being a slight clearance between the drill pipe and the walls of these holes. This slight clearance enables the cap and plate bushing to slide freely relative to the drill pipe when required, without binding with the latter. This clearance also serves to limit the extent of vibration and whipping of the drill pipe.

When associating the drill pipe with the apparatus, an initial length of pipe, substantially longer than the distance between the cap and plate bushings, is inserted through the cap bushing 84 and the upper end thereof is extended through the plate bushing 85. The lower end of the hole of the latter has a coned surface 92 diverging downwardly; it serves to guide insertion of the drill pipe from the guide collar 75 into the hole 89 of the plate bushing. A thick pilot ring 93 fitted in a recess 94 in the adjoining walls of the cover plate and guide collar in surrounding relation to the plate bushing 88 depends slightly below the latter so as to present a rounded inner edge 95 in close proximity to the wall of the guide collar. This inner edge 95 functions to lead this initial length of drill pipe as it is "blindly" admitted through the guide collar to pass from the latter onto the coned surface 92 of the plate bushing. The cap bushing 84 also has a coned inner surface 90 which may serve to guide the drill pipe through the bottom hole 91, if the initial drill pipe should be inserted down through the plate bushing 85.

Surrounding the guide collar 75 and disposed in an annular space 96 between the guide collar and a depending skirt portion 97 of the cover plate is a strong chuck engaging spring 98. This spring acts through a pressure ring 99 to press a group of radially slidable jaws 101 of the chuck body into gripping engagement with the drill pipe. The outer conical surface of the chuck body is interrupted by a group of equally spaced radial slots 102, here three in number. Radially slidable in each slot is one of the chuck jaws. Each jaw has a coned outer face 103 parallel to that 58 of the chuck body, and has a toothed inner face.

A pair of split spreader rings 104 constantly exert pressure on the jaws urging them radially outward of their slots. Each spreader ring is seated in part on recessed end shoulders 105 of the jaws, and its periphery presses against an arcuate back wall 106 of each shoulder. Each spreader ring is also seated in part on shoulders 107 of the chuck body. The latter shoulders have arcuate back walls 108 against which the periphery of the spreader rings are adapted to limit to curb the extent to which they may spread and, accordingly, limit the extent to which the jaws may be radially extended by the spreader rings out of their chuck slots.

Figure 12:
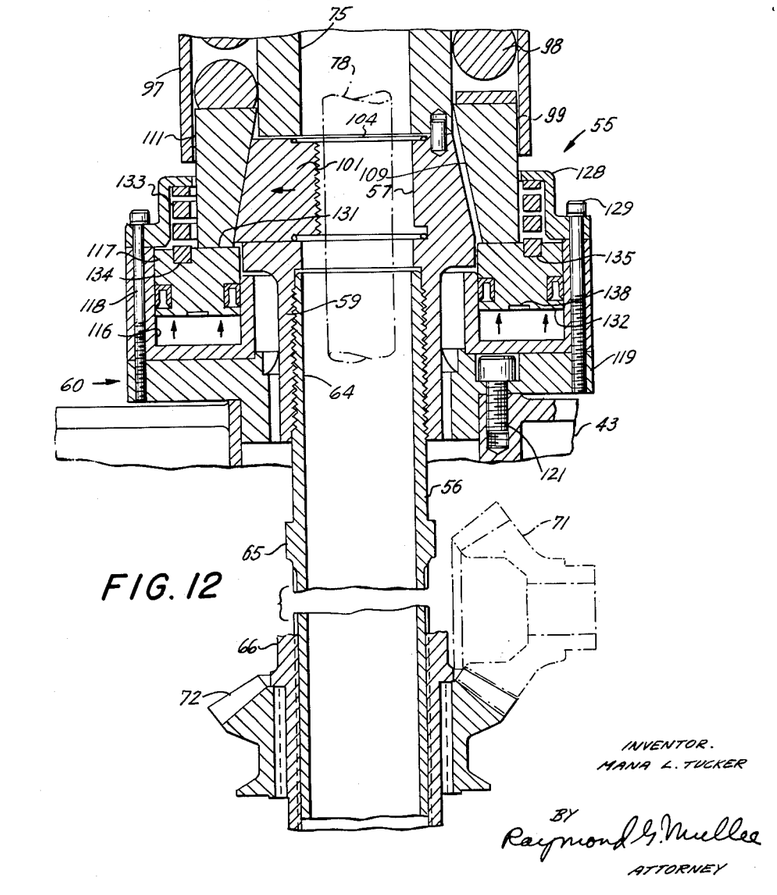
FIG. 12 is a sectional detail of the chuck showing the chuck jaws in open condition free of the drill pipe.

When the spreader rings are spread to the extent permitted, the coned surfaces of the jaws protrude outwardly of the coned surface of the chuck body, and their toothed inner faces protrude into the central bore of the chuck body clear of the axially centered drill pipe, as in FIG. 12.

The pressure ring 99 surrounds the coned area of the chuck body at all times; and has an internal coned surface 109 parallel to and relatively longer than the coned surfaces of the jaws and chuck body. The pressure ring is further defined by a cylindrical outer surface 111, and by parallel flat top and bottom end faces 112, 113, the bottom face 113 of which is relatively narrower than the top face. The pressure ring at all times extends at its upper end into the annular space 96 between the guide collar 75 and the skirt member 97; and it is guided to move vertically relative to the chuck body by means of the adjacent walls of the guide collar and skirt.

The pressure ring is constantly urged under the load of the heavy spring 98 in a downward direction, forcing the jaws radially inward of their slots into forceful gripping relation with the drill pipe, as appears in FIG. 8. The bottom end of the spring presses upon the upper flat face of the pressure ring, and its opposite end presses against a rigid annular adjusting plate 114. The latter is slidable about the guide collar in the annular space 96. A ring of socket screws 115, here three in number spaced equally apart, are adjustably threadable in openings of the cover plate 76 relative to the adjusting plate; whereby the compressive force of the spring 98 against the pressure ring may be adjusted accordingly as the screws 115 are threaded inwardly or outwardly, as appears in FIG. 16.

The normal condition of the chuck unit is shown in FIG. 8, wherein the chuck jaws 101 are tightly gripped closed upon the drill pipe 78 under the pressing force of the spring loaded pressure ring. In this closed condition, the bottom face 113 of the pressure ring depends below the coned surface of the chuck body into an annular piston chamber 116 of the hydraulically operable piston unit 60.

A hydraulically operable annular piston 117 workable in the piston chamber is cooperable with the depending bottom face of the pressure ring to raise the latter and relax its pressure from the chuck jaws so as to enable the spreader rings 104 to radially spread the chuck jaws clear of the drill pipe.

The piston chamber 116 is defined by an annular U-channel member 118 seated upon a base plate 119. The latter is bolted fast to the top of the cross head 43 by means of a ring of screws 121. A depending skirt 122 of the base plate fits in the bore 61 of the cross head in close spaced relation to the skirt 59 of the chuck body, and its bottom end wall limits against the outer race of the bearing member 62. The U-channel member 118 includes a bottom plate 124 resting upon the upper face of the base plate. It further has an inner annular wall 125 freely surrounding the chuck skirt 59, and an annular outer wall 126. Seated atop the latter is a flange portion of a crown cover 127, the crown top 128 of which surrounds with a slight clearance the lower portion of the pressure ring. The crown cover 127, U-channel member 118, and the base plate 119 are bolted fast to one another by means of a ring of screws 129.

The piston 117 has flat top and bottom faces 131, 132. It is normally held seated at the bottom of the piston chamber by means of a strong return spring 133. The coils of this spring are shown here as being square in cross section; the bottom coil 134 is seated in an annular channel 135 formed in the upper face of the piston; and the upper end of the spring limits against the inner surface of the crown top 128.

The piston is hydraulically movable against the bottom face of the pressure ring to relieve the chuck jaws of the pressure of the latter. An inflow passage 136 extending radially through the base plate 119 communicates with a port 137 formed centrally of the bottom wall of the piston chamber. The latter port communicates with a quick flow annular channel 138 recessed in the bottom face of the piston. The inflow passage is connected by means of a hose line 139 with the hydraulic chuck control valve 24. The latter is connected by hose lines 120 and 130 respectively with the pump and sump. When the control valve lever 136 is turned in one direction hydraulic fluid enters the piston chamber and quickly flows through the channel 138 beneath the piston to evenly force the piston upward; whereupon the top face of the piston engages the under end of the pressure ring and lifts the latter evenly away from the chuck jaws, allowing the spreader rings 104 to move the jaws clear of the drill pipe as in FIG. 12. When the control valve lever is returned in the opposite direction, the hydraulic pressure is relaxed from the underside of the piston, whereupon the chuck spring 98 acting through the pressure ring and supplemented by the force of the return spring 133 returns the piston quickly to the bottom of the piston chamber clear of the pressure ring. The quick flow channel 138 at the bottom of the piston, the relatively large passages 136, 137 and the associated hose line 139 provide rapid drainage of the hydraulic fluid from under the piston through the control valve 24 to sump. As the piston is being rapidly returned, the pressure ring acting under the strong force of the chuck spring moves swiftly downward to drive the chuck jaws to grip the drill pipe.

This rapid action of the chuck in hydraulically releasing and automatically re-gripping its jaws with the drill pipe saves considerable time and labor in the operation of the apparatus.

In preparing the apparatus for operation, the piston 117 is hydraulically operated to open the chuck jaws so as to allow an initial length of drill pipe to be extended through the cap and plate bushings 84, 85. This is done while the engine drive is disengaged from the spindle drive shaft 73 so that the chuck unit will not be rotating. The hydraulic pressure is then relaxed to allow the pressure ring under the load of the chuck spring 98 to close the jaws on the drill pipe. The swivel head 32 may then be turned about the axis H–H to a desired angle at which the ground bore is to be drilled. The engine drive is then re-clutched with the spindle drive shaft 73 to rotate the chuck unit. As the drill pipe is rotated by the chuck unit relative to the earth, the cross head control valve lever 45 is operated to cause the cross head 43 (which had previously been raised to its limit) to move downward and thus pressurize the rotating drill pipe as the bit at the end thereof bores into the earth. The rate of speed at which the cross head moves downward and thus the axial pressure on the drill pipe is controlled by the operator as he manipulates the control valve 44. Drilling is allowed to continue until the drill pipe has moved down into the ground to the extent permitted by the piston rods 41. The rotating spindle is first stopped by disengaging the engine clutch before the chuck piston is operated to release the chuck jaws from the drill pipe. While the jaws are so released, the cross head is re-raised to its limit relative to the drill pipe. The hydraulic pressure against the chuck piston is then relaxed to allow the chuck spring 98 to re-close the jaws on the drill pipe at the higher level. The length of the piston rods 41 is such as to permit about two feet of drill pipe to move down into the ground before it is necessary to re-raise the cross head. As the drill pipe moves down into the ground successive lengths of drill pipe, each about ten feet long, are added as required. Accordingly, it is obvious that the operations of unchucking will be repeated many times during the drilling of a deep hole. The rapid hydraulic unchucking action, and the swift automatic spring forced re-chucking operation save considerable time during deep drilling operations. If during the unchucking operation the hydraulic system should fail, the chuck spring 98 will operate automatically to re-grip the jaws with the drill pipe.

The automatic action of the chuck spring 98 in holding the jaws firmly gripped upon the drill pipe at all times unless intentionally released by the operator is of special advantage in deep hole drilling in avoiding loss of drill pipe from the chuck. The gripping action of the jaws is automatic because of the spring. No positive action of the operator is required to grip the jaws; but a positive action of the operator is required to release the jaws through hydraulic action to relax the spring pressure.

This short stroke of about two feet of the cross head enables the spindle cap bushing 84 to provide at all times desirable support to the drill pipe close to the ground, within a range of two feet from the ground, thus guarding against undesirable vibration of the pipe at this end. The rapid action of the unchucking and chucking operations saves time and thereby allows adequate time for use of the short ten foot lengths of pipe. The use of pipe longer than ten feet is not desired because of the undesirable whipping of the pipe that would take place above the plate bushing 85.

During the operation of the apparatus a water hose line, not shown, is attached to the upper end of the hollow drill pipe to supply flushing fluid through the bit to the bottom of the hole being drilled.

It is to be further noted with respect to the inner coned bottom wall of the cap bushing 84 that it communicates with the hole 91 through the latter, which hole has a slight clearance relative to the drill pipe. This coned cavity is of further advantage besides that earlier mentioned, in that it also leads water of condensation from the pipe through the slight clearance to the outside.

Figure 13:
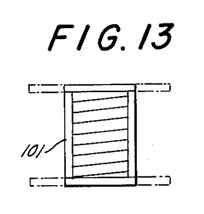
FIGS. 13, 14 and 15 are detail views showing respectively the differently formed toothed faces of the three chuck jaws.
Figure 14:
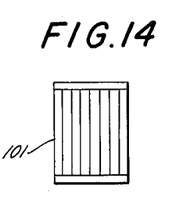
Figure 15:
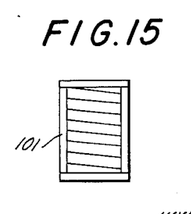

It is also to be noted from FIGS. 13–15 that each of the inner faces of the chuck jaws has a different tooth formation. One as in FIG. 13 is formed with a left hand thread, another as in FIG. 15 is formed with a right hand thread, and a third as in FIG. 14 is formed with vertical serrations. The biting force of each jaw on the drill pipe is accordingly directed in a different direction. This arrangement is of decided advantage in that it materially aids in preventing slippage of the jaws relative to the pipe in a rotative as well as in an axial direction during the rotation and pressurized axial movement of the drill pipe.

Figure 5:
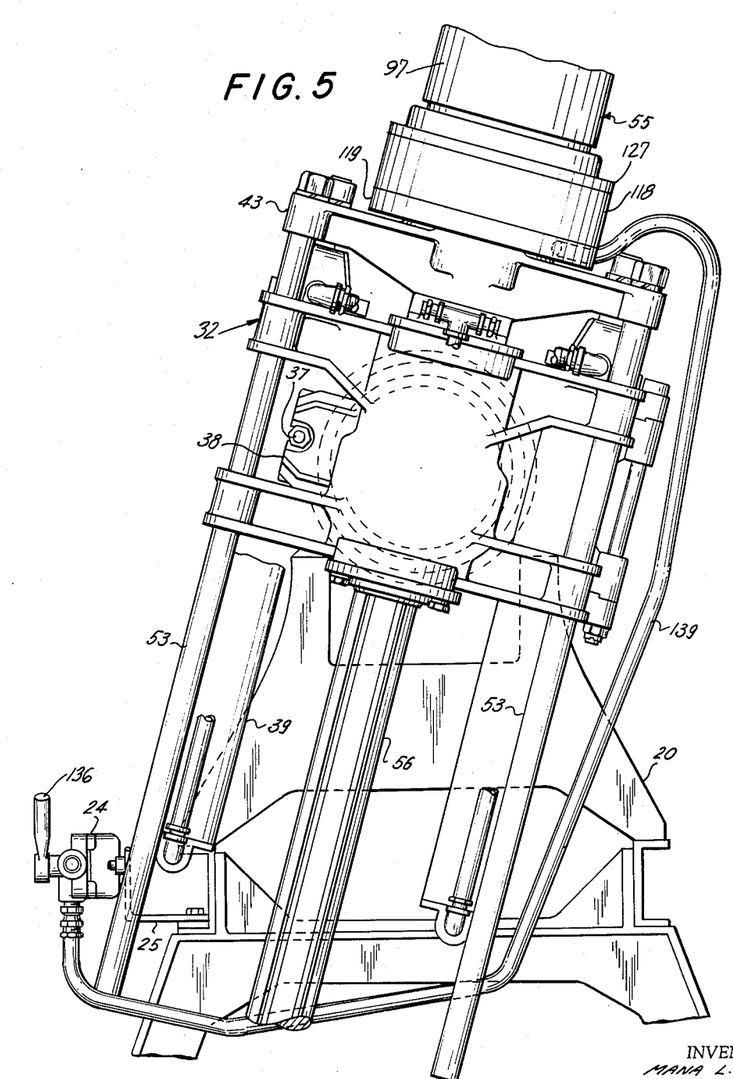
FIG. 5 is an elevational front end view showing the swivel head and the associated chuck assembly as having been pivoted on the horizontal axis H—H of FIG. 1 relative to the bed frame.

It is to be further noted that the chuck control valve 24 is located on the stationary bed frame 20 remote from the chuck base plate 119, and that it is connected (FIG. 5) with the latter by an elongated slack single hose line 139. Accordingly, as the cross head moves up and down relative to the swivel head, the hose line is able to follow it. This desirable arrangement enables the operator to hydraulically operate the chuck unit remotely from the latter at a position beside the bed frame. The operator is not obliged to climb over dangerous oily platforms or steps to operate the chuck as otherwise might be required.

It is also to be noted with respect to the hydraulic system, that the chuck and cross head control valves are integrated in the system so as to permit the use of a common pump 23 and sump 22. Further, the hose lines leading from the control valves to the various associated connections are such as to enable the cross head 43 to reciprocate, and the swivel head 32 to swivel relative to the bearing plate and to swing on its hinge without interference with the hose lines.

When the drilling operation is completed, the engine is stopped and the remaining drill pipe is removed from the chuck assembly. The latch bolt 37 is released from the swivel head and the latter is swung on its hinge 31 to carry the swivel head 32 and chuck assembly 55 away from the bore hole so as to enable conventional hoist apparatus to retrieve the drill pipe from the hole.

It is understood that basides drill pipe, other drill string such as drill rods and bars may be held by the chuck.

Figure 16:
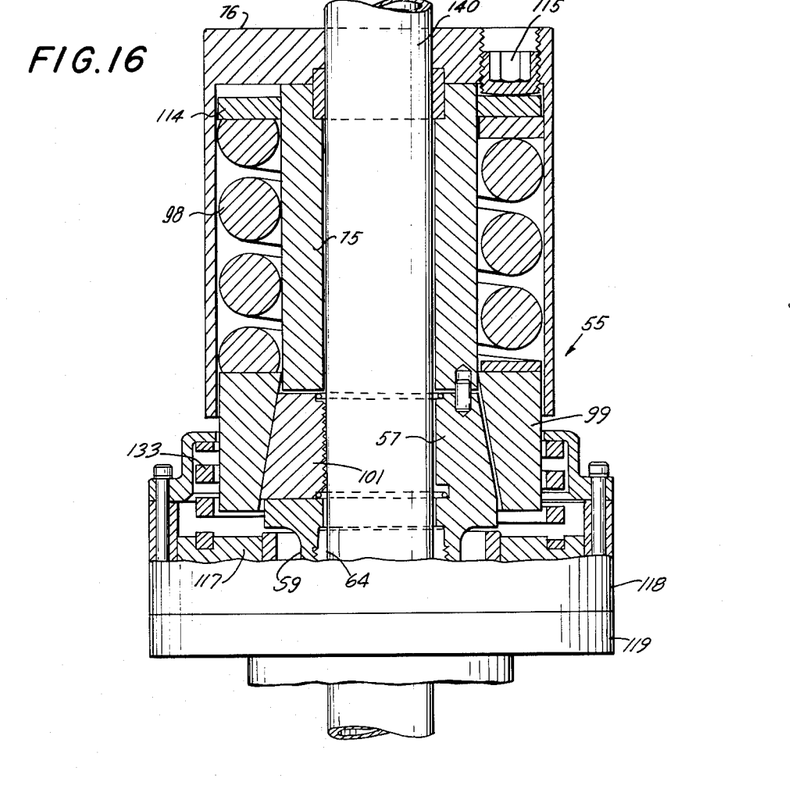
FIG. 16 is a sectional detail of the chuck unit from which the plate bushing has been omitted.

When it is desired that the chuck assembly accommodate a drill pipe 140 having a wider diameter than that shown in FIG. 8, the plate bushing 85 may be removed, as has been done in FIG. 16. It is understood that the cap bushing 84 shown in FIG. 8 would be then replaced with one having a wider bore hole to accommodate the extension of the wider pipe through the bottom end of the spindle.

While an embodiment of the invention has been illustrated and described in detail, it is to be expressly understood that the invention is not limited thereto. Various changes can be made in the design and arrangement of the parts without departing from the spirit and scope of the invention. It is intended, therefore, to claim the invention not only as shown and described, but also in all such forms as may reasonably be construed to fall within the spirit of the invention and the scope of the appended claims.

What is claimed is:

1. A hydraulically controlled chuck assembly including a hollow chuck body structure for the reception of a drill string workpiece axially thereof, the chuck body structure having a group of radially extending slots, a jaw radially slidable in each slot, and a pressure ring surrounding the jaws, annular spring means biasing the jaws radially outwardly of the chuck body structure, the pressure ring adapted when pressured in a downward direction to move the jaws radially inwardly of the chuck body structure to grip the workpiece and when pressured in the opposite direction to relax its pressure upon the jaws to release the workpiece, a strong spring constantly pressuring the pressure ring in said downward direction, a reciprocable non-rotatable support in which the chuck body structure is mounted for relative rotation, a hydraulic piston cylinder rigid with the support including a piston selectively movable against the pressure ring so as to pressure it in the said opposite direction, and the piston having a normal position seated in the piston cylinder clear of the pressure ring.

2. A hydraulically controlled chuck assembly as defined in claim 1, a frame structure upon which the reciprocable support is mounted, a driving sleeve in the frame structure, straight spline means slidably mounting the chuck body structure to the driving sleeve for relative longitudinal sliding movement and for rotation by the driving sleeve, wherein the straight spline means is defined by a depending spindle portion of the chuck body structure, and the chuck body structure having terminal guide means at opposite ends thereof for centralizing a workpiece received therein.

3. A hydraulically controlled chuck assembly as defined in claim 1, having externally adjustable means rotatable with the chuck body structure for selectively adjusting the pressure of the strong spring relative to the pressure ring.

4. In diamond drilling apparatus of the character described including a reciprocable support, a chuck assembly mounted on the support including a chuck unit having rotation relative to the support, a hydraulic piston unit having a piston cylinder rigid with the support, the chuck unit including a body member having a group of radial slots and a jaw radially slidable in each slot, spring means biasing the jaws radially outward of the body member, a pressure ring surrounding the jaws adapted when pressured in a downward direction to force the jaws radially inward against the bias of the spring means and when pressured in the opposite direction to relax said force from the jaws, a strong spring constantly pressing the pressure ring in said downward direction, and a piston hydraulically movable in the piston seated in the piston cylinder below and clear of the pressure ring cylinder against the pressure ring to pressure it in said opposite direction.

5. In diamond drilling apparatus according to claim 4, wherein a return spring is disposed in the piston cylinder constantly urging the piston to the bottom of the piston cylinder.

6. In diamond drilling apparatus according to claim 4, wherein the pressure ring normally depends below the said jaws into the piston cylinder under the pressing force of said strong spring, and the piston is cooperable with said depending portion of the pressure ring to force the pressure ring in said opposite direction.

7. Drilling apparatus for rotating a drill string to bore a hole into the earth and for advancing the drill string simultaneously downward, comprising a support, a frame anchored to the support, hydraulic cylinder means fixed to the frame having hydraulically actuable piston means carrying a cross head adapted to be selectively raised and lowered by the piston means for limited distances, and a chuck assembly mounted upon the cross head, wherein the chuck assembly includes a chuck body supported for rotation relative to the cross head and adapted for the reception of a drill string, the chuck body having a plurality of radial slots, jaws radially slidable inwardly of the slots to grip the drill string and radially slidable outwardly of the slots to release their grip, annular spring means common to the several jaws biasing them radially outward to released condition, a pressure ring surrounding the chuck body and the jaws adapted when pressured downward to press the jaws against the bias of the annular spring means to gripping condition relative to the drill string and when pressured in the opposite direction to permit release of the jaws under the bias of the annular spring means, a heavy spring constantly pressing the pressure ring in said downward direction, a piston cylinder open at its top end freely surrounding the chuck body below the jaws and being rigid with the cross head, the pressure ring having a bottom end normally depending into the open top end of the piston cylinder, an annular piston seated in the piston cylinder normally in spaced relation to the bottom end of the pressure ring and movable against the pressure ring so as to pressure the latter in an upward direction to relax its pressure from the jaws, manipulative control means for selectively applying operating hydraulic fluid to move the piston against the pressure ring, and return spring means constantly biasing the piston toward its seated condition.

8. Drilling apparatus as in claim 7, wherein conduit means is provided for causing rapid return of operating hydraulic fluid from the underside of the piston.

9. Drilling apparatus according to claim 7, wherein the piston has an annular channel centrally about its bottom face registering with a port communicating with the control means, the annular channel allowing quick flow of hydraulic fluid about the underside of the piston from said port.

10. In drilling apparatus of the character described including a selectively reciprocable frame, a hydraulically controlled chuck assembly mounted upon the frame for selectively chucking and unchucking a drill string comprising: a hollow chuck body structure for the reception of a drill string, a plurality of jaws radially slidable in the chuck body to and from gripping condition with the drill string, annular spring means urging the jaws radially outward to released condition clear of the path of the drill string, a pressure ring surrounding the jaws adapted when pressured in a downward direction to force the jaws radially inward against the annular spring means to gripping condition and adapted when pressured in an upward direction to relax its pressure from the jaws, a heavy spring constantly pressing the pressure ring downward, driving means coupled to the chuck body structure for rotating the latter relative to the reciprocable frame, a piston cylinder rigid with the frame located below and coaxially with the pressure ring, the pressure ring having a bottom end normally depending into the piston cylinder, a hydraulically actuable piston in the piston chamber movable against the pressure ring to pressure it in an upward direction, return spring means constantly urging the piston to the bottom of the piston cylinder clear of the pressure ring, and control means for selectively applying hydraulic fluid to the piston cylinder to actuate the piston against the resistance of both the return spring means and the heavy spring.

11. In the drilling apparatus as in claim 10, wherein the driving means coupled to the chuck body structure includes a drive shaft, a driving sleeve with which the chuck body structure is slidably splined, and gearing coupling the driving sleeve to the drive shaft.

12. In the drilling apparatus as in claim 10, wherein a skirt closely surrounds the heavy spring and pressure ring and has head plate means bolted to the chuck body structure, the head plate means of the skirt serving as an abutment for the upper end of the heavy spring, and the lower end of the skirt serving as a guide to the movement of the pressure ring.

13. In the drilling apparatus as in claim 12, wherein the head plate means includes a head plate integral with the skirt, a separate plate is disposed between the upper end of the heavy spring and the head plate, and a plurality of screws spaced angularly and equally apart are adjustably threadable in the head plate against the adjusting plate for adjusting the pressure of the heavy spring upon the pressure ring.

14. In the drilling apparatus as in claim 13, wherein the chuck body structure has an inner diameter greater than the outer diameter of the drill string receivable therein, and axially aligned terminal means are mounted at opposite ends of the chuck body having internal diameters complementary to the outer diameter of the drill string for centering the latter in the chuck body structure.

References Cited by the Examiner

UNITED STATES PATENTS

| | | | |
|---|---|---|---|
| 2,090,854 | 8/37 | Timbs | 173—149 |
| 2,638,324 | 5/53 | Ball et al. | 173—149 |
| 2,730,331 | 1/56 | Harnick | 173—149 |
| 2,829,865 | 4/58 | Wagner et al. | 173—149 |

FOREIGN PATENTS 533,370  8/31  Germany.

BROUGHTON G. DURHAM, *Primary Examiner.*